May 26, 1942.
B. DICK
2,284,189
BRAKE CONTROL MECHANISM
Filed Jan. 10, 1941
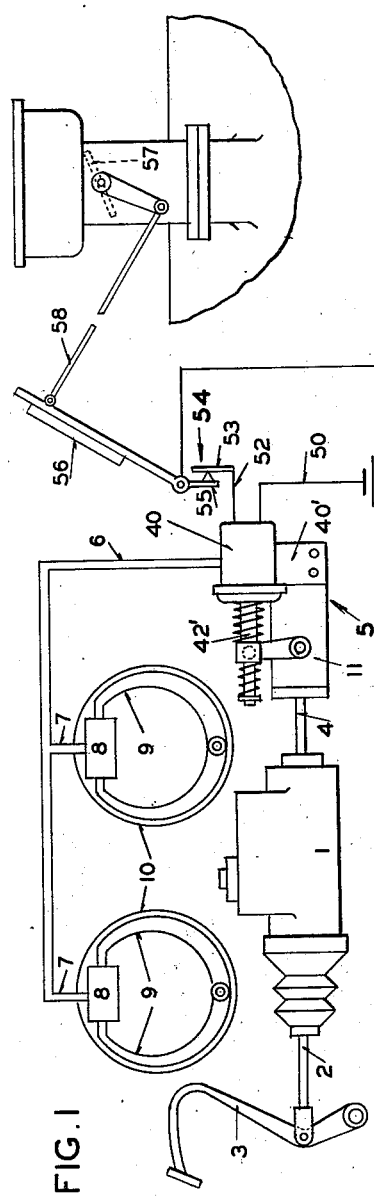
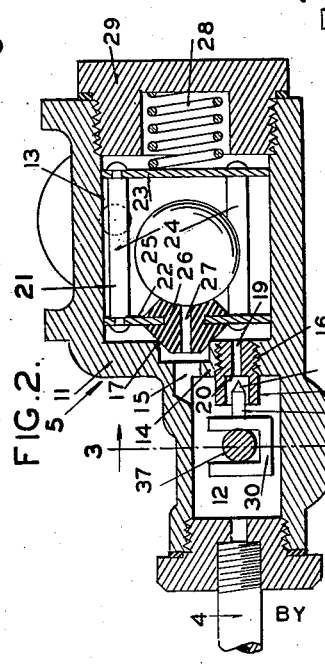
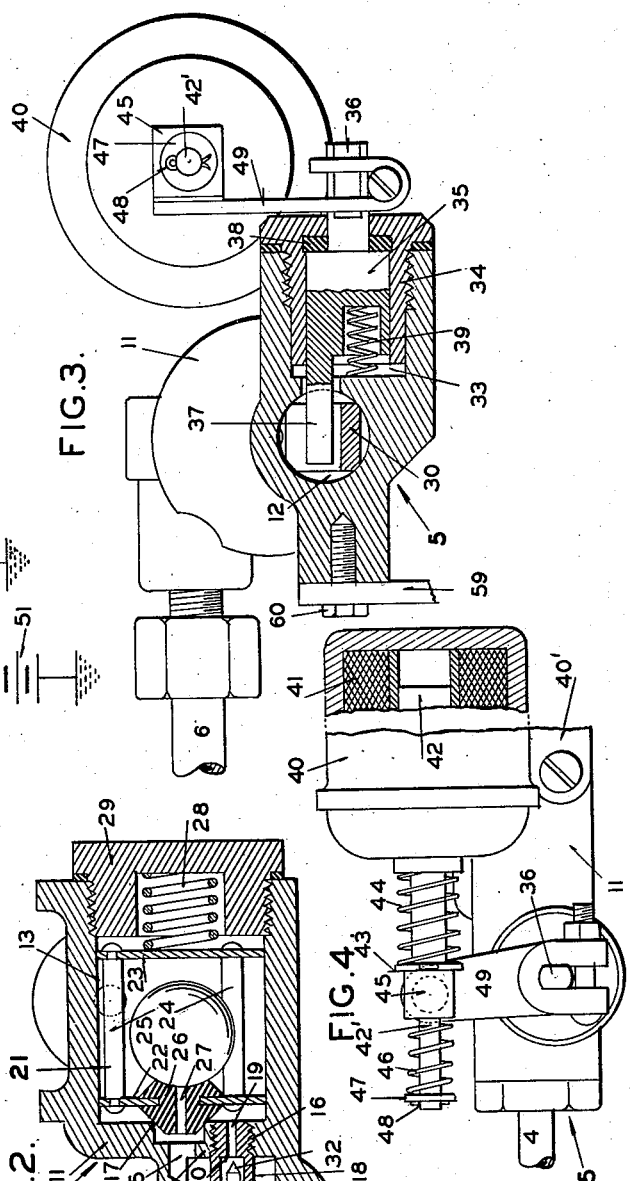
INVENTOR
BURNS DICK
BY
ATTORNEY Patented May 26, 1942

2,284,189

UNITED STATES PATENT OFFICE 2,284,189

BRAKE CONTROL MECHANISM

Burns Dick, Ferguson, Mo., assignor to Wagner Electric Corporation, St. Louis, Mo., a corporation of Delaware Application January 10, 1941, Serial No. 373,873

11 Claims. (Cl. 192—3)

My invention relates to brakes and more particularly to means for holding the brakes applied under certain conditions.

One of the objects of my invention is to provide an improved valve means for association with a fluid pressure braking system whereby fluid under pressure can be maintained to act on the brakes.

Another object of my invention is to provide fluid pressure operated brakes with pressure holding valve means that can be efficiently controlled by an electrical circuit including a solenoid.

Still another object is to provide improved control means for holding fluid brakes applied which is cheap to manufacture and easy to install and operate.

Other objects of my invention will become apparent from the following description taken in connection with the accompanying drawing in which Figure 1 is a schematic view of a fluid pressure braking system having associated therewith a brake holding valve means and control means therefor embodying my invention; Figure 2 is a longitudinal sectional view of the holding valve; Figure 3 is a sectional view taken on the line 3—3 of Figure 2; and Figure 4 is an enlarged view of the connection between the solenoid and the actuating shaft.

Referring to the drawing in detail, numeral 1 indicates a master cylinder device of known construction, the piston of which (not shown) is actuated by a piston rod 2 and a brake pedal 3. The outlet of the master cylinder is connected by a conduit 4 through my improved holding valve generally indicated by numeral 5 to a conduit 6 having branch conduits 7 leading to the actuating motors 8 for the brake shoes 9 of brake assemblies 10 (two only being shown).

My improved holding valve 5 comprises a casing 11 having chambers 12 and 13 divided by a partition 14. The chamber 12 is connected to conduit 4 coming from the master cylinder and chamber 13 is connected to the conduit 6 leading to the brake actuating motors (see Figure 3). In the partition 14 are two passages 15 and 16, the former having associated therewith a seat 17 at its entrance to chamber 13 and the latter having threads into which is screwed a member 18 having a small passage 19 (approximately three thirty-seconds in diameter as an example) and a valve seat 20 presented toward chamber 12.

The chamber 13 is cylindrical and positioned therein is a cage 21 comprising end plates 22 and 23 and connecting rods 24, the lower two of which (one only being shown in Figure 2) form a track on which a ball 25 is mounted. The end plate 22 carries a rubber valve element 26 provided with a passage 27. This valve element on the outer side of the plate engages the valve seat 17 and is held in sealing engagement therewith by a spring 28 interposed between the end plate 23 and a closure plug 29 for chamber 13. The ball 25 cooperates, under certain conditions to be later described, with the inner side of valve element 26 in order to close passage 27 and prevent fluid from flowing from chamber 13 to chamber 12 through passage 15 but not in the opposite direction.

The chamber 12 is also of cylindrical form and positioned therein for sliding movement is a U-shaped block 30 carrying a projection 31 provided with a conical end 32. This conical end is adapted to cooperate with the valve seat 20 to form a needle valve for controlling the small passage 19.

Also formed in the casing and positioned at right angles to the axis of chamber 12 is a bore 33 closed by a bearing plug 34 in which is journaled a shaft 35 having a concentric portion 36 extending to the exterior and an eccentric portion 37 extending into chamber 12 and positioned between the legs of block 30. A seal 38 is provided between the shaft and the plug and a spring 39 holds the end of the shaft in pressure engagement therewith.

The shaft 35 and the needle valve which it controls may be actuated by any desired actuator. In the particular holding means disclosed and embodying the improved valve means just described, this actuator is shown as a solenoid 40 having a winding 41 and being mounted on the exterior of valve casing 11 by a bracket 40'. The armature 42 of the solenoid is provided with an external extending rod 42' to which is secured a washer 43 forming a shoulder engaged by one end of a spring 44 interposed between it and the solenoid casing. By means of this construction, the spring can normally hold the armature of the solenoid in an inoperative position. On the rod 42' beyond the washer 43 is loosely mounted a block 45 which is biased against the washer by a spring 46 interposed between said block and a second washer 47 held on the end of the rod by a pin 48. The block is pivotally connected to the end of an arm 49 which is keyed to the concentric end 36 of shaft 35, thereby completing the connection between the solenoid and said shaft.

One end of the winding of the solenoid is connected by a conductor 50 to a grounded battery 51 and the other end of said winding is connected by a conductor 52 to a fixed element 53 of a switch 54. The movable element 55 of this switch is carried by the accelerator pedal 56 of the vehicle on which the brakes are provided, said pedal actuating the carburetor valve 57 by means of a connection 58. When the pedal is in its normal "off" position to place the valve 57 in engine idling position, the elements of switch 54 will be in contact and the switch closed. When the pedal is moved to open the valve 57, the switch will be opened. The circuit is completed by having the movable element of the switch connected to ground.

The casing of the holding valve is mounted to some fixed part 59 of the vehicle by a stud-bolt 60. In mounting the casing, the track is positioned in order to be longitudinal of the vehicle and is slightly inclined toward the forward end of said vehicle so that the ball will engage the element 26 and close passage 27 when the vehicle is on a level roadway.

In operation when the accelerator pedal is in "off" position, switch 54 will be closed and the solenoid energized. This will cause the rod 42' to be moved to the right, as viewed in Figure 4, thereby compressing spring 44 and by means of spring 46 rotating the arm 49 clockwise and causing the eccentric portion 37 of the shaft 35 to move the U-shaped block and close the needle valve. If the needle valve closes before the armature of the solenoid "bottoms" against the end of the solenoid casing to produce maximum pull, spring 46 will yield and permit such "bottoming." With the needle valve closed, no fluid can flow in either direction through passage 19.

If the vehicle is stopped on a horizontal roadway or facing upwardly on an inclined roadway when the accelerator is off, the ball will be in engagement with valve element 26. If the brakes have already been applied, they will be so maintained since fluid will be trapped in the motors 8, notwithstanding the brake pedal is subsequently released. If the brakes have not been applied, they are permitted to be applied by actuating the brake pedal since fluid under pressure can flow to the motors by the unseating of ball 25. Once the brakes are applied, they will be so held without holding the foot on the brake pedal. This permits the foot which is used to apply the brakes to be employed for other uses such as starting the engine. Also, the foot is free to be placed on the accelerator preparatory to starting. With the brakes held applied, the vehicle cannot roll rearwardly on the incline. If the vehicle is facing downwardly on an incline, the brakes will not be held applied since, under these conditions, the action of gravity will cause the ball to be disengaged from the valve element 26 and the passage 15 to be open.

When it is desired to move the vehicle forward, the brakes will be automatically released at the time the accelerator pedal is depressed to speed up the engine. Depressing of the accelerator pedal opens the switch and breaks the circuit. The solenoid will now be de-energized and spring 44 will so rotate arm 49 and shaft 45 as to open the needle valve. With the de-energizing of the solenoid the fluid pressure acting on the needle valve, which is in a direction tending to unseat the conical end 32, will also assist in opening said valve. The trapped fluid pressure is then released through passage 19.

If the vehicle is moving forwardly on a roadway and the accelerator is released to "off" position, the valve means will not cause fluid to be trapped in the brake actuating motors if the brakes are applied, notwithstanding the solenoid will be energized. This is because under these circumstances the ball 25 will be held away from the element 26 due to the action of inertia thereon resulting from deceleration of the vehicle when the accelerator pedal is off. If the brakes are applied, the action of inertia will be increased. Thus it is seen that the valve means can only be effective to hold the brakes applied when the vehicle is stopped on a level roadway and facing upwardly on an inclined roadway and the accelerator pedal is in "off" position.

By the use of the needle valve, only a small force is required to hold the fluid trapped regardless of the pressure developed in the brake actuating fluid motors. The small passage 19 exposes only a small area of the conical end 32 to the fluid pressure which tends to open the valve. Thus even if pressure as high as a thousand or more pounds per square inch is developed, the force required to hold the needle valve closed against leakage will only be a few pounds. This force is further decreased by the eccentric arrangement on the shaft and by the lever 49. With a small actuating force required at the free end of the lever to hold the needle valve closed, it is seen that only a small solenoid will also be required to produce the force and consequently there will be a small current draw on the battery when the solenoid is operative. The control arrangement thus is very economical notwithstanding the solenoid is energized whenever the accelerator pedal is placed in "off" position. If the valve means were such that a large solenoid were required, there would be too much current drawn from the battery to economically employ the brake holding means and electrical control shown and described. The connection between the solenoid rod 42' and the arm permits the armature of the solenoid to "bottom" regardless of any imperfect adjustment. This feature is important since it permits maximum holding force to be obtained for a given current consumption.

Being aware of the possibility of modifications in the particular structure herein described without departing from the fundamental principles of my invention, I do not intent that its scope be limited except as set forth by the appended claims.

Having fully described my invention, what I claim as new and desire to secure by Letters Patent of the United States is:

1. The combination with a motor vehicle provided with an accelerator mechanism and with fluid pressure actuated brakes comprising a fluid motor for actuating the brakes, a source of pressure and conduit means for placing the source in communication with the motor, of valve means comprising a combined gravity and inertia controlled ball associated with the conduit means for causing the valve means to be closed when the vehicle is stopped and thus prevent return flow of fluid to the source and to be open when the vehicle is decelerating, a small by-pass passage around the valve means, a needle valve element for closing said by-pass, and means for controlling the needle valve element by the accelerator mechanism, said means being so associated with the accelerator mechanism and the valve element that said valve element will be closed when the accelerator mechanism is in "off" position and open when the accelerator mechanism is in other positions.

2. The combination with a motor vehicle provided with an accelerator mechanism and with fluid pressure actuated brakes comprising a fluid motor for actuating the brakes, a source of pressure and conduit means for placing the source in communication with the motor, of valve means comprising a combined gravity and inertia controlled ball associated with the conduit means for causing the valve means to be closed when the vehicle is stopped and thus prevent return flow of fluid to the source and to be open when the vehicle is decelerating, a small by-pass passage around the valve means, a needle valve element for closing said by-pass, and means operable when the accelerator mechanism is in "off" position for closing said needle valve element and when in other positions for permitting the needle valve element to be open, said last named means comprising a solenoid, an electrical circuit and a switch controlled by the accelerator mechanism.

3. In a fluid pressure braking system for a vehicle having an accelerator mechanism for the engine thereof, a source of pressure, an actuating motor, conduit means for placing the source in communication with the motor, valve means associated with the conduit means for preventing return flow of fluid from the motor and comprising an element subject to the action of gravity for closing said valve means and to the action of inertia during deceleration of the vehicle for causing said valve means to be open, a by-pass passage around the valve means and having associated therewith a valve seat, a valve element cooperating with the seat and movable off said seat in the direction of flow of fluid through the passage from the motor to the source, and means for controlling the needle valve element by the accelerator mechanism, said means being so associated with the accelerator mechanism and the valve element that said valve element will be closed when the accelerator mechanism is in "off" position and open when the accelerator mechanism is in other positions.

4. In a fluid pressure braking system for a vehicle having an accelerator mechanism for the engine thereof, a source of pressure, an actuating motor, conduit means for placing the source in communication with the motor, valve means associated with the conduit means for preventing return flow of fluid from the motor and comprising an element subject to the action of gravity for closing said valve means and to the action of inertia during deceleration of the vehicle for causing said valve means to be open, a by-pass passage around the valve means and having associated therewith a valve seat, a valve element cooperating with the seat and movable off said seat in the direction of flow of fluid through the passage from the motor to the source, means comprising a solenoid when energized for holding said valve element seated, an electrical circuit including a switch for engaging the solenoid, and means operable by the accelerator mechanism when in "off" position for closing said switch, said switch being open when the accelerator mechanism is moved to a position to speed up the engine.

5. In a fluid pressure braking system for a vehicle, a source of pressure, an actuating motor, conduit means for placing the source in communication with the motor, valve means associated with the conduit means for preventing return flow of fluid from the motor and comprising an element subject to the action of gravity for closing said valve means and to the action of inertia during deceleration of the vehicle for causing said valve means to be open, a by-pass passage around the valve means and having associated therewith a valve seat, a valve element cooperating with the seat and movable off said seat in the direction of flow of fluid through the passage from the motor to the source, and means for holding the valve element closed against fluid pressure and comprising a shaft connected to actuate the valve element and means for rotating the shaft.

6. In a fluid pressure braking system for a vehicle, a source of pressure, an actuating motor, conduit means for placing the source in communication with the motor, valve means associated with the conduit means for preventing return flow of fluid from the motor and comprising an element subject to the action of gravity for closing said valve means and to the action of inertia during deceleration of the vehicle for causing said valve means to be open, a by-pass passage around the valve means and having associated therewith a valve seat, a valve element cooperating with the seat and movable off said seat in the direction of flow of fluid through the passage from the motor to the source, means comprising a solenoid when energized for holding said valve element seated, and an electrical circuit including a switch for energizing the solenoid.

7. In a fluid pressure system, a source of pressure, an actuating motor, conduit means for placing the source in communication with the motor, valve means associated with the conduit means for preventing return flow of fluid from the motor and comprising a valve seat, a rolling ball valve subject to the action of gravity for engaging the seat and preventing flow of fluid from the motor to the source, a by-pass passage around the seat and ball and provided with a valve seat having a small hole therethrough, a needle valve element for engaging the by-pass seat, said needle valve element being movable off the seat in the direction of flow of fluid from the motor to the source, a shaft having an eccentric portion for operating the needle valve element, and means for rotating said shaft.

8. In a fluid pressure system, a source of pressure, an actuating motor, conduit means for placing the source in communication with the motor, valve means associated with the conduit means for preventing return flow of fluid from the motor and comprising a valve seat, a rolling ball valve subject to the action of gravity for engaging the seat and preventing flow of fluid from the motor to the source, a by-pass passage around the seat and ball and provided with a valve seat having a small hole therethrough, a needle valve element for engaging the by-pass seat, said needle valve element being movable off the seat in the direction of flow of fluid from the motor to the source, a shaft having an eccentric portion for operating the needle valve element, an arm on the shaft, a solenoid connected to the arm for rotating the shaft when energized and seating the needle valve element, and a circuit including a switch for the solenoid.

9. In a fluid pressure system, a source of pressure, an actuating motor, conduit means for placing the source in communication with the motor, valve means associated with the conduit means for preventing return flow of fluid from the motor and comprising a valve seat, a rolling ball subject to the action of gravity for engaging the seat and preventing flow of fluid from the motor to the source, a by-pass passage around the seat and ball and provided with a valve seat having a small hole therethrough, a needle valve element for engaging the by-pass seat, said needle valve element being movable off the seat in the direction of flow of fluid from the motor to the source, means comprising a solenoid when energized for holding the needle valve element seated, and an electrical circuit for energizing the solenoid.

10. In a fluid pressure system for a vehicle, a source of pressure, an actuating motor, conduit means for placing the source in communication with the motor, valve means associated with the conduit means for preventing return flow of fluid from the motor and comprising a valve casing having two chambers one of which is connected to the source and the other to the motor, means forming two passages between the chambers, a rolling ball positioned in the latter chamber and controlling one of said passages, said ball being subject to the action of gravity to close said passage and to the action of inertia to open said passage, a needle valve controlling the other passage and having its needle valve element positioned in the first chamber and movable off its seat in the direction of flow of fluid from the motor to the source, an element in the first chamber for moving the needle valve element, and means actuated from the exterior of the casing for moving the element to close the needle valve element.

11. In a fluid pressure system for a vehicle, a source of pressure, an actuating motor, conduit means for placing the source in communication with the motor, valve means associated with the conduit means for preventing return flow of fluid from the motor and comprising a valve casing having two chambers one of which is connected to the source and the other to the motor, means forming two passages between the chambers, a rolling ball positioned in the latter chamber and controlling one of said passages, said ball being subject to the action of gravity to close said passage and to the action of inertia to open said passage, a needle valve controlling the other passage and having its needle valve element positioned in the first chamber and movable off its seat in the direction of flow of fluid from the motor to the source, an element in the first chamber for moving the needle valve element, and means actuated from the exterior of the casing for moving the element to close the needle valve element, said means comprising a shaft having an eccentric portion engaging the element in the chamber and an arm for rotating the shaft.

BURNS DICK.